UNITED STATES PATENT OFFICE.

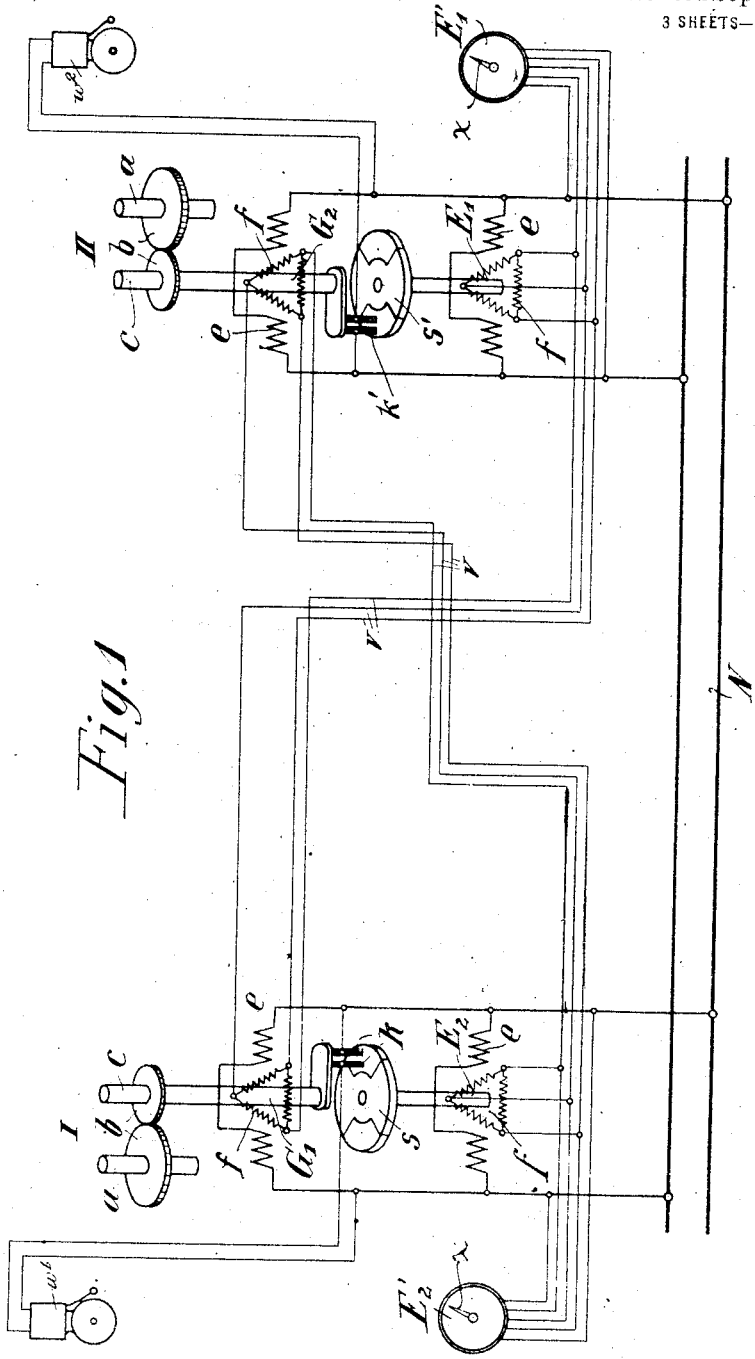

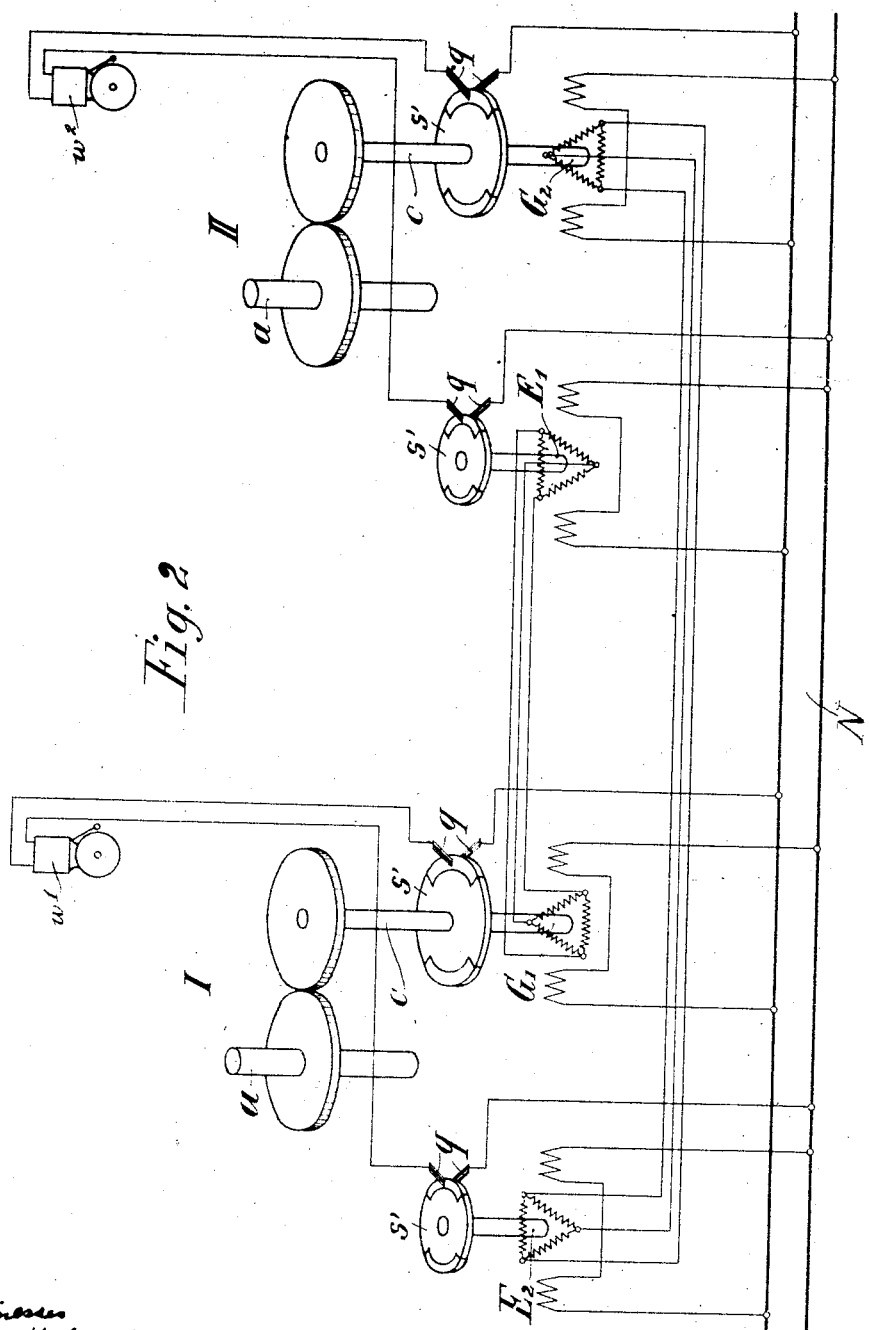

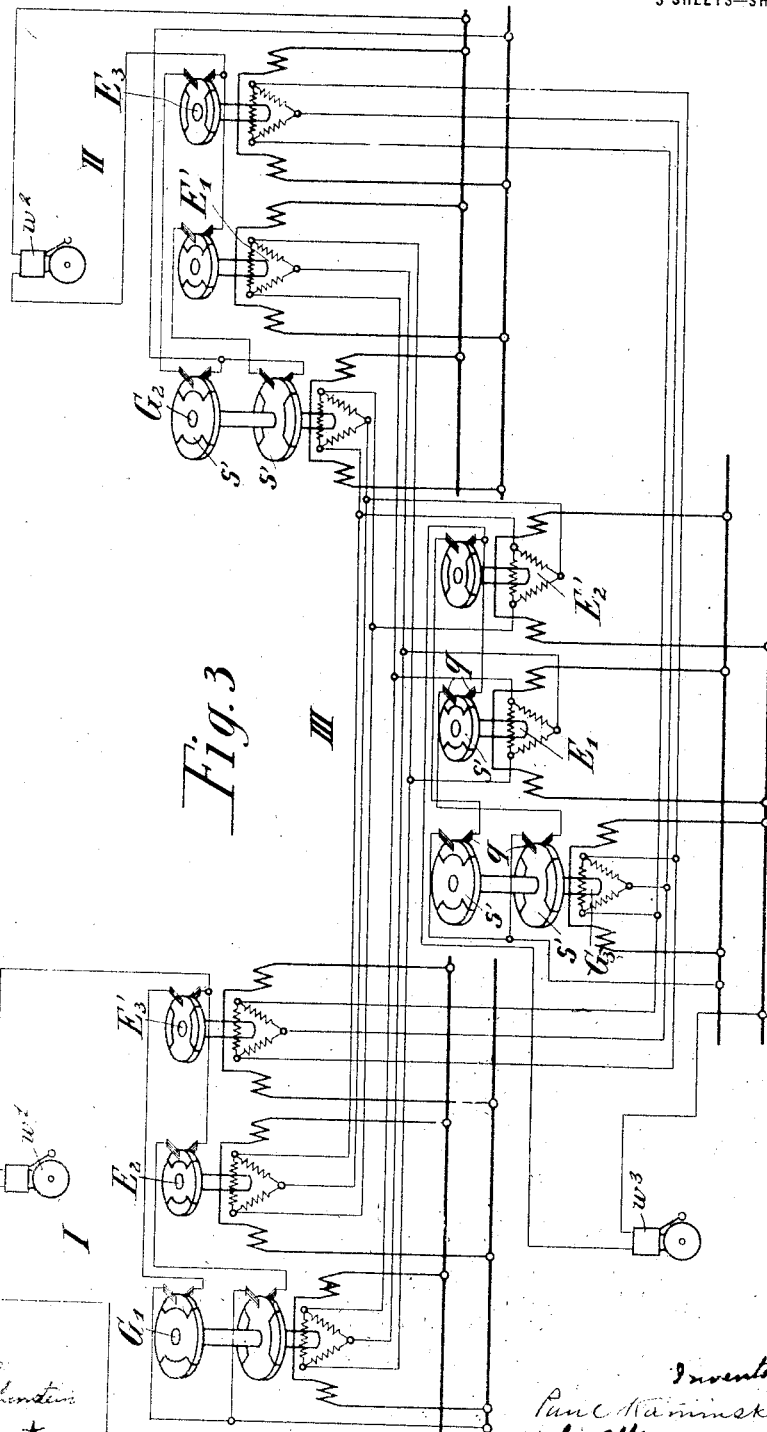

PAUL KAMINSKI, OF SPANDAU, NEAR BERLIN, GERMANY, ASSIGNOR TO SIEMENS & HALSKE, A. G., OF BERLIN, GERMANY, A CORPORATION OF GERMANY.

SIGNALING SYSTEM FOR RECIPROCALLY CONTROLLING SEVERAL STATIONS.

1,197,212.  Specification of Letters Patent.  Patented Sept. 5, 1916.

Application filed June 12, 1912. Serial No. 703,409.

*To all whom it may concern:*

Be it known that I, PAUL KAMINSKI, a citizen of the Empire of Germany, and residing at Spandau, near Berlin, Germany, have invented certain new and useful Improvements in Signaling Systems for Reciprocally Controlling Several Stations, of which the following is a specification.

My invention relates to signaling systems for reciprocally controlling several stations.

In systems comprising several individually movable, selective stations, particularly those having turn tables, it frequently happens that one of the stations extends its range into the range of action of another similar station and thus disturbs its operation of that station or otherwise endangers the system. For example, when two turntables are connected with a series of shunting tracks it may happen that two engines are simultaneously despatched from the two turntables onto intersecting tracks and that a collision may consequently occur.

Now devices have heretofore been proposed for giving a signal when the movable selective element of one station moves into the danger zone of the other. These known arrangements generally consist in each of the movable parts being provided with a number of contact segments or contact-pieces so connected that alarms are operated in predetermined positions of the movable parts. These devices have, however, the disadvantage that when there is a large number of danger positions a very large number of connecting lines must be provided between the individual stations.

A primary object of my invention is to obviate this defect. To this end, I connect a sender of a synchronous signaling system with each of the rotatable elements of the stations, and at each station there is a receiver for each sender. The reciprocal position of each station-sender or of the station element itself relative to that of the appertaining receivers automatically indicates at any time the position of this element relatively to that of the element of the other stations. Consequently, in this arrangement as many signaling systems are required as there are selective station elements. The number of the connecting lines is, however, relatively small, because, for example, only three connecting lines are required for each system when alternating-current synchronous systems are employed whose exciting windings are connected to an alternating-current distributing system. As all the danger positions can be expressed within one revolution of the senders or receivers, however, the number of the connecting lines is independent of the number of the danger positions. It is consequently possible with the given number of systems to provide for any desired large number of danger positions in a simple and satisfactory manner.

Several illustrative embodiments of my invention are represented by way of example in the accompanying drawings, wherein:—

Figure 1 is a diagram showing a safety system of the type described for two stations representing, for example, locomotive turntables; Fig. 2 shows a modified form of system in which the sender and receiver of one station do not act directly with contact devices on one another, and Fig. 3 shows a similar arrangement in which three stations are represented instead of two.

Referring first to Fig. 1, at each station I and II the axle $c$ of a sender $G_1$ or $G_2$ is driven through the medium of toothed gearing $b$ by an axle $a$ rotated by the turntable at the station. Each sender belongs to a common alternating-current system N, to which the field windings $e$ of the senders and the receivers $E_1$, $E_2$ are connected, the armatures $f$ of the corresponding sender and receivers being connected by three equalizing lines $v$. The alternating current system above referred to is well known in the modern art of transmitting angular movements of mechanical elements, such as occur for instance in ship signaling apparatus and the like. The electrical elements of two coöperating stations, for instance, $E_2$, $G_2$, Fig. 1, consist of a three phase alternating current armature $f$ in delta connection, shown in the drawings in the conventional diagrammatic manner, and of field windings $e$ also shown diagrammatically. The two armatures are connected by the wires $v$ as shown, whereas the field windings $e$ of both stations are connected to the same mains N to which a single phase alternating current is supplied (source not shown here). It is well known in the art that if in such arrangement one armature is moved angularly from its normal position, equalizing currents are set up in it which flow through wires $v$ and tend to move the other armature into the corresponding angular position. These currents cease to flow as soon as this position has been reached by this other armature. It is obvious that one armature which might be called the transmitter may cause the angular movement of several receiver armatures connected to it in parallel. For instance in Fig. 1 the armature $f$ of $G_2$ operates the armature $f$ of $E_2$ and a similar armature in $E'_2$. The armature of the indicator $E'_2$ is not shown in the drawings. Fast on each sender axle $c$ are two contact-brushes $k$, $k_1$, insulated from one another, which are respectively connected to alarm devices $w_1$, $w_2$ and slide on contact-disks $s$, $s_1$, connected with the axles of the receivers $E_2$, $E_1$. Lastly, each of the receivers $E_2$, $E_1$ is connected in parallel with an auxiliary receiver $E'_2$ and $E'_1$, respectively, having a pointer $x$. It will be understood that these receivers are provided with similar electrical coils and connections as the transmitters and receivers, and operate in the same manner. The number of the electrically conducting and electrically non-conducting parts on the contact-disks $s$, $s_1$ is disposed in view of the mutual danger positions of the stations I and II. The sender $G_1$ when the turntable at the station I is rotated is brought into the corresponding position by means of the gearing $a$, $b$, $c$, so that the brushes $k$ move over the contact-disk $s$ onto electrically conducting or non-conducting parts according to the position of the receiver $E_2$, and accordingly close or keep open the circuit of the alarm $w_1$. If the alarm is sounded it indicates that the turntable is in a dangerous position relative to that of the turntable at the station II, i. e. in a position in which an engine starting from the turntable at the one station will cross the path of an engine starting from the other turntable. Simultaneously as the turntable at the station I and its sender $G_1$ are rotated the receiver $E_1$ is rotated at the station II, so that here also, owing to the rotation of the disk $s_1$, the reciprocal position of the two turntables is indicated and the alarm $w_2$ is sounded or remains silent. In order not only to indicate the presence of a danger position but also to prevent the same, I provide the two auxiliary or supervisory receivers $E'_1$ and $E'_2$ which permanently indicate on a scale the position of the other turntable, whereby the movements of the turntables can be continuously supervised by comparing the position of each turntable with that of the pointer $x$ at the same station. Of course any well known means for indicating simultaneously the position of the local table may be employed. Such expedients are obvious to any one skilled in the art, and for this reason they have been omitted in the drawings.

Referring now to Fig. 2, the sender and receiver of one station are each coupled with a contact disk $s'$ on which slide fixedly mounted contact-brushes $q$ connected in series to the signaling devices $w_1$ and $w_2$. The contact-disks $s'$ are provided in the above described manner with electrically conducting and non-conducting parts, so that the circuit of a signaling device is closed as soon as the two pairs of brushes $q$ at one station are located on electrically conducting parts.

Referring to Fig. 3, a similar arrangement is here represented, but instead of the two stations shown in Fig. 2 there are three controlling systems $G_1$, $E_1$, $E'_1$, and $G_2$, $E_2$, $E'_2$ and $G_3$, $E_3$, $E'_3$. The sender at each station is provided with two contact-disks $s'$; the circuit of one of the alarms $w_1$, $w_2$, $w_3$ goes by way of fixedly mounted pairs of brushes $q$ by way of each of these senders and each of the receiver contact-disks $s'$ controlled by the two foreign stations, so that there are as many parallel circuits for the alarms as there are foreign stations. The mode of operation of this arrangement is the same as that described above with reference to Fig. 2. Instead of the acoustic signals $w_1$, $w_2$, $w_3$ I may provide optical instruments. If desired, however, these signals may be substituted by relays which in the danger positions cut off the current for the motors driving the turntables at the stations.

I claim:—

1. In means for reciprocally controlling a plurality of rotary objects each located at a station, the combination of a plurality of electric signaling systems, each interconnecting all the stations and each comprising a sender operatively connected to the object at one station and a receiver at each other station adapted to be moved synchronically with the sender associated therewith, the sender and the one or more receivers at each station being placed in operative relation to one another for indicating the position of the object there, relative to the positions of all the other objects and signaling means for delivering attention signals, when the object at a home station has a predetermined position to that of an object at a foreign station.

2. In means for reciprocally controlling a plurality of rotary objects each located at a station, the combination of a plurality of electric signaling systems, each interconnecting all the stations and each comprising a sender operatively connected to the object at one station and a receiver at each other station adapted to be shifted synchronically with the sender associated therewith, and signaling means operatively connected with the sender and with the one or more receivers at each station in operative relation to one another for indicating the position of the object there, relative to the positions of all the other objects, and signaling means for delivering attention signals, when the object at a home station has a predetermined position to that of an object at a foreign station.

3. In means for reciprocally controlling a plurality of rotary objects each located at a station, the combination of a plurality of electric signaling systems, each interconnecting all the stations and each comprising a sender operatively connected to the object at one station and a receiver at each other station adapted to be shifted synchronically with the sender associated therewith, an indicator having two members in operative relation one to the other, the one member being coupled to a sender at one station and the other to a receiver at the same station, for indicating the position of the object at one station relative to that at another station, and signaling means for delivering attention signals, when the object at a home station has a predetermined position to that of an object at a foreign station.

4. In means for reciprocally controlling a plurality of rotary objects each located at a station, the combination of a plurality of electric signaling systems, each interconnecting all the stations and each comprising a sender operatively connected to the object at one station and a receiver at each other station adapted to be moved synchronically with the sender associated therewith, the sender and the one or more receivers at each station being placed in operative relation to one another for indicating the position of the object there relative to the positions of all the other objects and signaling means comprising contact devices operatively connected with the sender and with the one or more receivers at a station for delivering acoustic signals when an object at a home station has a predetermined position relative to that of an object at a foreign station.

5. In means for reciprocally controlling a plurality of rotary objects each located at a station, the combination of a plurality of electric signaling systems, each interconnecting all the stations and each comprising a sender operatively connected to the object at one station and a receiver at each other station adapted to be moved synchronically with the sender associated therewith, the sender and the one or more receivers at each station being placed in operative relation to one another for indicating the position of the object there, relative to the position of all the other objects, a plurality of contact devices at each station, each comprising a contact-disk and a set of brushes contacting therewith, the one being coupled to the sender and the other to a receiver; and signaling means connected to said brushes and controlled by said contact devices for delivering signals when one of said objects has a predetermined position relative to another object.

6. In means for reciprocally controlling a plurality of rotary objects each located at a station, the combination of a plurality of electric signaling systems, each interconnecting all the stations and each comprising a sender operatively connected to the object at one station and a receiver at each other station adapted to be moved synchronically with the sender associated therewith, the sender and one or more receivers at each station being placed in operative relation to one another for indicating the position of the object there, relative to the positions of all the other objects, a plurality of pairs of contact-disks, one contact-disk of each pair being coupled to a sender and the other to a receiver, and said contact-disks having contact-pieces adapted to those predetermined positions of the object associated therewith which are to be indicated; a plurality of fixed brushes contacting with said contact-disks, and means comprising a signaling device electrically connecting in series the brushes contacting with each of said pairs of contact-disks, for delivering signals when the brushes contacting with a pair of contact-disks simultaneously contact with contact-pieces thereof.

In testimony whereof, I have signed my name to this specification in the presence of two witnesses.

PAUL KAMINSKI.

Witnesses:
 HENRY HASPER,
 WOLDEMAR HAUPT.